United States Patent
Pampus et al.

(10) Patent No.: US 9,910,149 B2
(45) Date of Patent: Mar. 6, 2018

(54) METHOD FOR MAPPING THE SURROUNDINGS OF A VEHICLE

(75) Inventors: Christian Pampus, Leonberg (DE); Dirk Schmid, Simmozheim (DE); Michael Scherl, Bietigheim (DE); Werner Urban, Vaihingen/Enz (DE); Meike Fehse, Rutesheim (DE); Uwe Zimmermann, Remseck (DE); Michael Schoenherr, Renningen-Malmsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1708 days.

(21) Appl. No.: 13/499,410

(22) PCT Filed: Aug. 13, 2010

(86) PCT No.: PCT/EP2010/061852
§ 371 (c)(1),
(2), (4) Date: Aug. 10, 2012

(87) PCT Pub. No.: WO2011/038978
PCT Pub. Date: Apr. 7, 2011

(65) Prior Publication Data
US 2012/0303258 A1   Nov. 29, 2012

(30) Foreign Application Priority Data

Oct. 2, 2009 (DE) ................. 10 2009 045 286

(51) Int. Cl.
*B60W 30/095* (2012.01)
*G01S 13/93* (2006.01)
(Continued)

(52) U.S. Cl.
CPC .......... *G01S 13/931* (2013.01); *B60R 21/013* (2013.01); *B60W 30/0956* (2013.01);
(Continued)

(58) Field of Classification Search
CPC ..... B60R 21/013; B60W 30/08; G01G 1/168; G01S 13/931
See application file for complete search history.

(56) References Cited

U.S. PATENT DOCUMENTS 5,574,463 A * 11/1996 Shirai ................... G01S 7/4802
342/115
5,754,099 A * 5/1998 Nishimura ................ B60T 7/22
340/435

(Continued)

FOREIGN PATENT DOCUMENTS

DE    198 45 048    4/2000
DE    103 19 700    11/2004
(Continued)

OTHER PUBLICATIONS

Friedrich Dierks of Dortmund University, Institute for Robotics Research "Free Navigation of Autonomous Vehicles" in Autonome Mobile Systeme 1994 (Autonomous Mobile Systems 1994). P. Levi and Th. Bräunl, Eds., Springer-Verlag, pp. 43-46, including English abstract.

(Continued)

*Primary Examiner* — Thomas G Black
*Assistant Examiner* — Peter D Nolan
(74) *Attorney, Agent, or Firm* — Norton Rose Fulbright US LLP; Gerard Messina

(57) ABSTRACT

A method for mapping surroundings of a vehicle, objects in the surroundings of the vehicle being detected with the aid of sensors and particular detected objects being described by two coordinate points and also by a position fuzziness assigned to the particular coordinate point, the coordinate points and the position fuzziness values being stored in an interface in the form of data which may be accessed by driver assistance systems of the vehicle. A method is also described for ascertaining the collision probability of a (Continued)

vehicle with an object, in which the surroundings of the vehicle are initially mapped using the method for mapping the surroundings of a vehicle, a travel path to be traveled by the vehicle is ascertained in a subsequent step, and the degree of overlap between the object and the travel path and also the collision probability are finally determined, taking the position fuzziness into account.

12 Claims, 3 Drawing Sheets

(51) Int. Cl.
 *B60R 21/013* (2006.01)
 *B60W 50/14* (2012.01)
 *B62D 15/02* (2006.01)
(52) U.S. Cl.
 CPC ......... *B60W 50/14* (2013.01); *B62D 15/0285* (2013.01); *B60T 2201/10* (2013.01); *G01S 2013/9314* (2013.01); *G01S 2013/9353* (2013.01); *G01S 2013/9364* (2013.01); *G01S 2013/9389* (2013.01)

(56) References Cited

U.S. PATENT DOCUMENTS

| | | | | |
|---|---|---|---|---|
| 7,218,385 | B2* | 5/2007 | Takagi | B60W 40/02 356/4.01 |
| 7,656,508 | B2* | 2/2010 | Iwaki | G01C 3/08 356/4.03 |
| 2005/0225439 | A1* | 10/2005 | Watanabe | B62D 15/027 340/435 |
| 2005/0243301 | A1* | 11/2005 | Takagi | B60W 40/02 356/4.07 |
| 2006/0204039 | A1* | 9/2006 | Maemura | B60T 7/22 382/104 |
| 2008/0079954 | A1* | 4/2008 | Iwaki | G01C 3/08 356/614 |
| 2009/0135048 | A1* | 5/2009 | Jordan | G01S 7/411 342/70 |
| 2009/0135065 | A1* | 5/2009 | Tsuchida | G01S 13/931 342/454 |
| 2009/0201192 | A1* | 8/2009 | Tokoro | B60R 21/0134 342/70 |

FOREIGN PATENT DOCUMENTS

| | | |
|---|---|---|
| DE | 103 24 897 | 12/2004 |
| DE | 10 2005 002 760 | 8/2005 |
| DE | 10 2005 006965 | 9/2005 |
| DE | 10 2004 047484 | 4/2006 |
| DE | 10 2005 061718 | 5/2007 |
| DE | 10 2007 039038 | 1/2009 |
| EP | 1 270 367 | 1/2003 |
| EP | 1 475 764 | 11/2004 |
| EP | 1 643 269 | 4/2006 |
| EP | 2 068 173 | 6/2009 |
| JP | 63-231285 | 9/1988 |
| JP | 04184882 A | 7/1992 |
| JP | 7-104062 | 4/1995 |
| JP | 9-184882 | 7/1997 |
| JP | 2000-276696 | 10/2000 |
| JP | 2002-240661 | 8/2002 |
| JP | 2003-241836 | 8/2003 |
| JP | 2005-12465 | 1/2005 |
| JP | 2007172266 A | 7/2007 |

OTHER PUBLICATIONS

"Parking Assistance" in Handbuch Fahrerassistenzsysteme (Handbook of Driver Assistance Systems) Hermann Winner, Stephan Hakuli, Gabriele Wolf (Eds.), Vieweg+Teubner, 2009, pp. 471-502, including English abstract.

Wikipedia article on Normalverteilung (Normal Distribution) https://de.wikipedia.org/wiki/Normalverteilung (2007) including English translation of first paragraph.

* cited by examiner

METHOD FOR MAPPING THE SURROUNDINGS OF A VEHICLE

FIELD OF THE INVENTION

The present invention is directed to a method for mapping the surroundings of a vehicle. The present invention furthermore relates to a method for ascertaining the collision probability of a vehicle with an object.

BACKGROUND INFORMATION

In driver assistance systems which take into account the vehicle surroundings, for example systems which support the motor vehicle driver in parking or systems which are used to maintain a sufficiently great distance from a preceding vehicle, it is necessary to effectively detect the surroundings. In systems for supporting the parking maneuver, for example, the surroundings are detected with the aid of ultrasonic sensors. If a larger area of the vehicle surroundings is to be monitored, in particular, radar sensors or cameras are also used.

Parking assistance systems which guide the driver into a parking space are discussed for example in DE-A 10 2004 047484 or also in EP-A 1 270 367. In parking assistance systems of this type, a parking space is first measured upon passing the space, and the driver is subsequently guided into the parking space with the aid of indications. The guidance into the parking space may take place in passive form, steering angle instructions as well as starting and stopping commands being transmitted to the driver, or it may take place in active form in which the driver receives only starting and stopping instructions, while the steering takes place automatically via a steering actuator system. The parking assistance system used specifies whether and how the vehicle may be guided from the present position into the parking space and also determines the end position for the parking maneuver.

During parking, the surroundings are monitored by distance-measuring sensors, which are generally situated in the bumpers of the vehicle. The distance to detected objects may be displayed to the driver, and the driver is warned of imminent collisions with surrounding objects. If the parking assistance system includes a rear assist camera, the driver also receives information about the area behind the vehicle with the aid of a video image. In the known systems, the driver has control over acceleration and deceleration during the parking maneuver. The parking speed is determined by the position of the accelerator pedal, and the driver is requested, shortly before reaching the end position of the parking maneuver, to brake the vehicle to a stop. In this system, the driver has full responsibility with regard to longitudinal guidance, i.e., of the forward and backward movements, at all times during the entire parking maneuver. In unforeseen situations, in particular, for example if a previously unidentified obstacle appears during parking, this results in the fact that the driver is independently responsible for a resulting unknown braking operation.

In the latest developments of parking assistance systems, the longitudinal guidance is also handled by automatic intervention into the drive and/or brake. In these systems, it is of fundamental importance that objects with which the vehicle may collide be detected in time, to prevent an imminent collision with the aid of a braking operation which is then to be initiated automatically.

SUMMARY OF THE INVENTION

In the method according to the present invention for mapping the surroundings of a vehicle, in which objects in the vehicle surroundings are detected with the aid of sensors, particular detected objects are described with the aid of two coordinate points and a position fuzziness assigned to the particular coordinate point, the coordinate points and the position fuzziness values being stored in an interface in the form of data which may be accessed by driver assistance systems of the vehicle.

The advantage of the method according to the present invention is that the ascertained data must be recorded only once and may then be used by all driver assistance systems present in the vehicle. A general object interface, which may be used to describe the properties of the object, is needed for the driver assistance systems to be able to use the data. For a driver assistance system, it is important, in particular, to know the free area around the vehicle where no objects are located. Knowledge of the precise shape of an object is generally not necessary. For this reason, it is usually sufficient to describe an object with the aid of two points which may be connected by a line segment. The line segment marked by the two points represents the delimitation of the free area by an object.

To be able to use the ascertained data in the driver assistance system, it is furthermore advantageous if an indication of whether the detected object is a single point or whether the coordinate points mark a line segment is stored in the interface as a further element. If the coordinate points mark a line segment, it is furthermore advantageous if it is additionally defined whether the points each describe the actual end of a line segment and thus a corner point of the detected object.

Since a two-dimensional representation is generally sufficient, and the height of the object is not important for use in a driver assistance system, the points are advantageously displayed in a two-dimensional, Cartesian coordinate system. For example, the central point of the rear axle is used as the origin of the Cartesian coordinate system. However, any other clearly defined point with reference to the vehicle may be used as the origin of the coordinate system. The abscissa and the ordinate of the Cartesian coordinate system are generally situated at right angles to each other. The abscissa may point in any direction. However, the abscissa may be oriented in the direction of travel. If the central point of the rear axle is used as the origin of the coordinate system, the ordinate is then oriented perpendicularly to the abscissa along the rear axle.

To enable the object to be identified via the interface, the following data may be stored in the interface:
- an identification number of the object;
- the abscissa position of a first point of the object;
- the ordinate position of the first point;
- an imprecision of the abscissa position of the first point;
- an imprecision of the ordinate position of the first point;
- the abscissa position of a second point of the object;
- the ordinate position of the second point;
- an imprecision of the abscissa position of the second point;
- an imprecision of the ordinate position of the second point;
- a type definition of the object.

As the object type definition, an indication is made of whether the object is a single-point object or an object that delimits a line segment in the vehicle surroundings. It is also possible to indicate whether the object is an invalid one as the type definition. If the object is a single-point object, the coordinates of the first point are identical to the coordinates of the second point. This is the case, for example, with a round post.

If two points having different coordinates are detected but the actual size of the object is not recognized, a detected line segment may be described by the first and second points, but the points do not indicate the corner points of the object. The object may thus extend along the line segment over the points. In another type which may occur, only one end of the object is detected. This detected end of the object is defined by the first point. The second point describes the end of the detected line segment, it being possible for the object to extend beyond the second point. As a further object type, the actual size of the object is detected. The ends of the object are described by the first and the second points. Indicating the object type tells a driver assistance system which uses the data of the interface the extent to which the actual length or width of an object was detected or whether the object is able to extend over the detected points.

In the method according to the present invention for ascertaining the collision probability of a vehicle with an object, the following steps are included:

(a) mapping the vehicle surroundings;
(b) ascertaining a travel path to be traveled by the vehicle;
(c) determining the degree of overlap between the object and the travel path and thus the collision probability, taking the position fuzziness into account.

To map the vehicle surroundings, objects in the vehicle surroundings are detected with the aid of sensors and particular detected objects having two coordinate points and a position fuzziness assigned to the particular coordinate point are described, the coordinate points and the position fuzziness values being stored in an interface in the form of data which may be accessed by driver assistance systems of the vehicle.

Determining the collision probability makes it possible for a driver assistance system, for example a driver assistance system for supporting the parking maneuver, to automatically bring the vehicle to a stop if there is danger of a collision. This makes it possible to autonomously guide the vehicle with the aid of a parking assistance system.

In addition to use in a parking assistance system, it is also possible, for example, to permit an intelligent vehicle display for the motor vehicle driver, for example by displaying the detected objects together with the possible travel course to the driver from a bird's eye perspective and to highlight potential collision situations with the aid of colors. Side protection during a maneuver is furthermore conceivable, in that, for example, warnings are transmitted to the driver by tracking the detected objects in the surroundings, if objects which are located outside the view field of the sensors are about to collide with the vehicle, which is possible, for example when maneuvering too tightly around a corner.

In addition to the above-described data, which are stored in the interface, it is furthermore useful—in particular when using parking assistance systems—if the motion state of the detected object is additionally stored in the interface. By storing the motion state of the object, it is possible to predict a possible collision time, for example taking the vehicle movement into account, and thus issue a warning to the driver in time. The vehicle may also be brought to a stop in time in the case of fully automatic systems. Unnecessary warnings can be avoided if the object crosses the path or veers and thus leaves the travel path due to its movement.

The side delimitations of the travel path, i.e., of the area covered by the vehicle during travel, are generally determined by the path of the outer-curve, the front corner of the vehicle, and the trajectory of the inner-curve vehicle side level with the rear axle. These points form the outermost delimitation of the area over which the vehicle passes, so that no areas of the vehicle are located outside the travel path during the vehicle movement if these points are used to delimit the travel path.

The position fuzziness of a coordinate point may be described by a Gaussian distribution around the coordinate point. The maximum of the Gaussian distribution is located on a level with the coordinate point. Setting the Gaussian distribution to determine the position fuzziness takes into account, for example, the measuring inaccuracy in detecting the coordinate point.

If both coordinate points, by which the object is described, are located on the same side of the travel path, it is sufficient if only the coordinate point of the object closest to the travel path is used to determine the degree of overlap. Computing time may be saved thereby, which makes it possible to determine the collision probability more quickly. The use of the coordinate point closest to the travel path is sufficient, since the collision probability decreases as the distance from the vehicle path increases. In addition, the coordinate point closest to the travel path represents the point of the object most proximate to the travel path.

To reduce the computing time and thus simplify the determination of the collision probability, it is furthermore sufficient if only the ordinate coordinate of the coordinate point of the object is taken into account to determine the degree of overlap. The use of only the ordinate coordinate has the advantage that no overlapping area needs to be determined but only the portion of the position fuzziness in the direction of the ordinate which overlaps the edge of the travel path.

If the coordinate points of the object are located on different sides of the travel path, or if one coordinate point is located in the travel path, a collision probability of 100% is assumed. The 100% collision probability may be assumed, since the object described by the coordinate points lies across the travel path if the coordinate points are located on different sides. Even if only one coordinate point is located in the travel path, at least a portion of the object is positioned in the travel path, so that a collision is certain if the vehicle travels without braking.

If both coordinate points are outside the travel path, but an overlap with the position fuzziness is detected, the vehicle is brought to a stop, which may be in the event of a collision probability of 30%, before the position of the object is reached.

The collision probability may be ascertained, for example, by correlating the y portion of the position fuzziness within the travel path with the entire position fuzziness in the y direction. The quotient calculated in this manner then results in the collision probability.

It must be assumed, in principle, that the collision probability is less than 50% when the coordinate points are located on a side outside the travel path, and a collision probability of more than 50% when one of the coordinate points is located in the travel path.

Exemplary embodiments of the present invention are illustrated in the figures and explained in greater detail in the following description.

DETAILED DESCRIPTION

Figure 1:
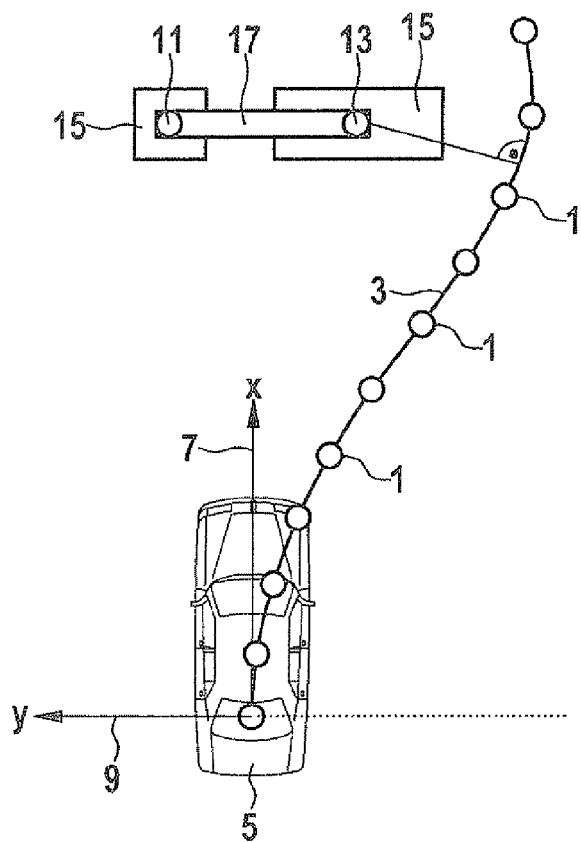
FIG. 1 shows a course trajectory made up of trajectory planning points for bypassing an object.

FIG. 1 shows a course trajectory made up of trajectory planning points for bypassing an object.

A course trajectory 3 which is made up of trajectory planning points 1 is used, for example, in a guided parking maneuver which was preceded by a corresponding trajectory planning. For this purpose, a suitable parking space is first measured and course trajectory 3 is calculated from the data measured in this manner using trajectory planning points 1. Course trajectory 3 is usually the trajectory which is traveled by the central point of the rear axle. Trajectory planning points 1, which characterize course trajectory 3, may be situated, for example, equidistantly on course trajectory 3. Alternatively, however, it is also possible for the distance between trajectory planning points 1 to be a function of the particular trajectory curvature of course trajectory 3. In the case of a larger trajectory curvature, for example, a smaller distance between trajectory planning points 1 is used in one area. Individual trajectory planning points 1 may be connected to each other by straight line sections. Alternatively, however, it is also possible to assemble the trajectory planning points with the aid of clothoid sections to form course trajectory 3. The advantage of using clothoid sections is that no sharp bends occur at individual trajectory planning points 1 but instead a continuous curve is created. The advantage of connecting the trajectory planning points with the aid of straight line sections is that the calculation is simplified compared to the use of clothoid sections. Individual trajectory planning points 1 are described with the aid of coordinates in a Cartesian coordinate system. The coordinate system may be oriented, as shown in FIG. 1, in such a way that the origin of the coordinate system is located at the central point of the rear axle of vehicle 5. In the coordinate system, abscissa 7 is identified by letter x and ordinate 9 is identified by letter y.

Sensors, which are not illustrated herein, are mounted on vehicle 5 to detect the surroundings. The sensors may be used to capture the vehicle surroundings. The sensors are usually positioned in the front and rear bumpers of vehicle 5. Commonly used sensors are, for example, ultrasonic sensors and radar sensors. It is also possible, for example, to use a camera for detecting objects. When the sensors detect an object, the object is described by a first coordinate point 11 and a second coordinate point 13. Any measuring inaccuracies that may occur are described by indicating a position fuzziness 15, which is represented in FIG. 1 by a rectangle around particular coordinate point 11, 13. A line segment 17 which connects first coordinate point 11 and second coordinate point 13 to each other represents a delimiting line which results from the detected object. The precise geometry of the object is not ascertained. Line segment 17 which is delimited by first coordinate point 11 and second coordinate point 13 represents the most proximate delimitation of the detected object in relation to vehicle 5.

According to the exemplary embodiments and/or exemplary methods of the present invention, first coordinate point 11, second coordinate point 13 as well as position fuzziness value 15 for coordinate points 11 and 13 are stored in an interface which may be accessed by driver assistance systems. In this way, it is possible, for example, to calculate a course trajectory 3 which bypasses the detected object, as shown in FIG. 1. In addition to a parking assistance system, any other assistance system present in the vehicle may also be provided with the data. In this way, it is not necessary for each vehicle assistance system to carry out separate measurements, but instead data may be accessed by all driver assistance systems once they have been ascertained.

Figure 2:
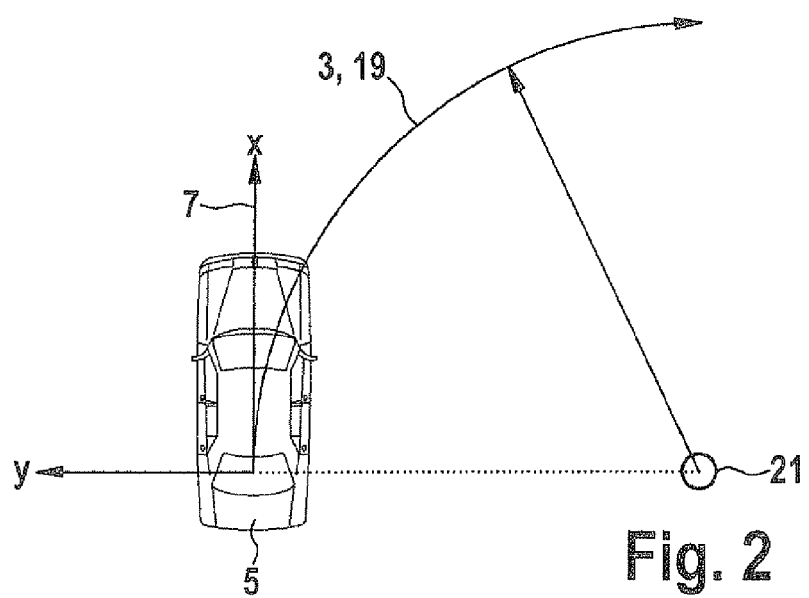
FIG. 2 shows a travel trajectory without previous trajectory planning.

FIG. 2 shows a travel trajectory without any previous trajectory planning. In contrast to FIG. 1, in which a course trajectory 3 is calculated by a corresponding driver assistance system to reach a particular destination, a travel trajectory is ascertained, for example, from the present vehicle motion state, in the event that no trajectory planning has been carried out, for example when the driver independently parks in a parking space without using a corresponding parking assistance system. For example, a circular trajectory 19 presently being traveled is used as a course trajectory 3 which results from an instantaneously present steering angle. Circular trajectory 19 is guided around a central point 21. Central point 21 is located on a level with the rear axle of vehicle 5.

Figure 3:
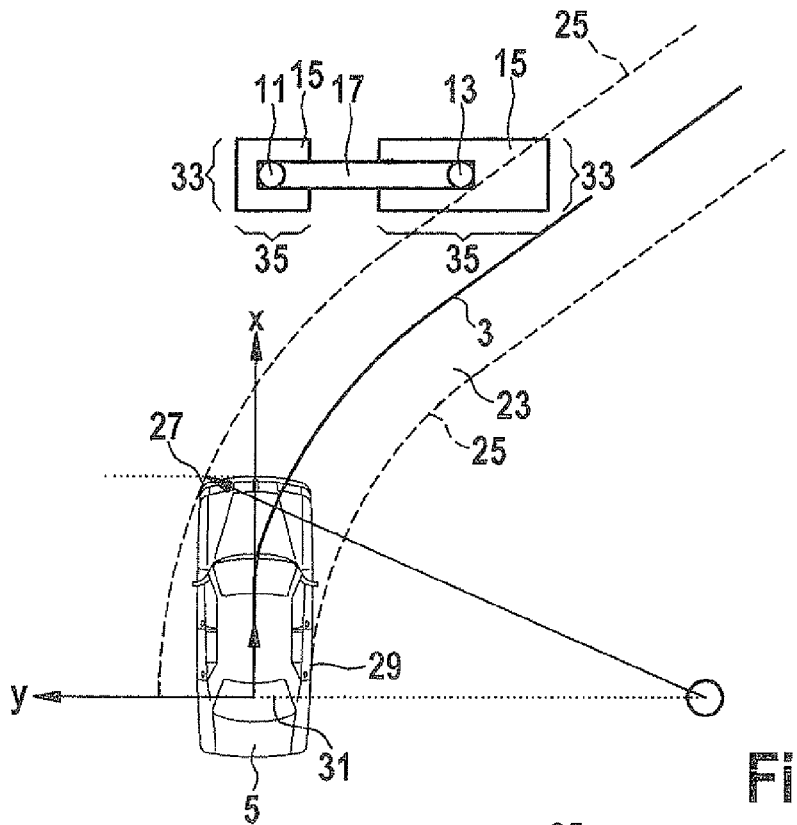
FIG. 3 shows a travel path having an object which is characterized by two coordinate points.

FIG. 3 shows a travel path having an object which is characterized by two coordinate points.

A collision of vehicle 5 with an object results not only when the object is located on course trajectory 3 but also when portions of the object are located in a travel path 23 which is covered by vehicle 5 during travel. Side delimitation 25 of travel path 23 is produced by the trajectory of outer-curve, front vehicle corner 27 and inner-curve vehicle side 29 on rear axle 31.

The degree of overlap between the object position and travel path 23, taking the position fuzziness into account, may then be used as a measure of the collision probability for a particular object. Position fuzziness 15 is indicated by a line segment 33 in the abscissa direction and a line segment 35 in the ordinate direction in relation to particular coordinate point 11, 13. The length of the line segment in abscissa direction 33 or ordinate direction 35, designated by position fuzziness 15, is a function, for example, of the position of the point in relation to the vehicle.

Figure 4:
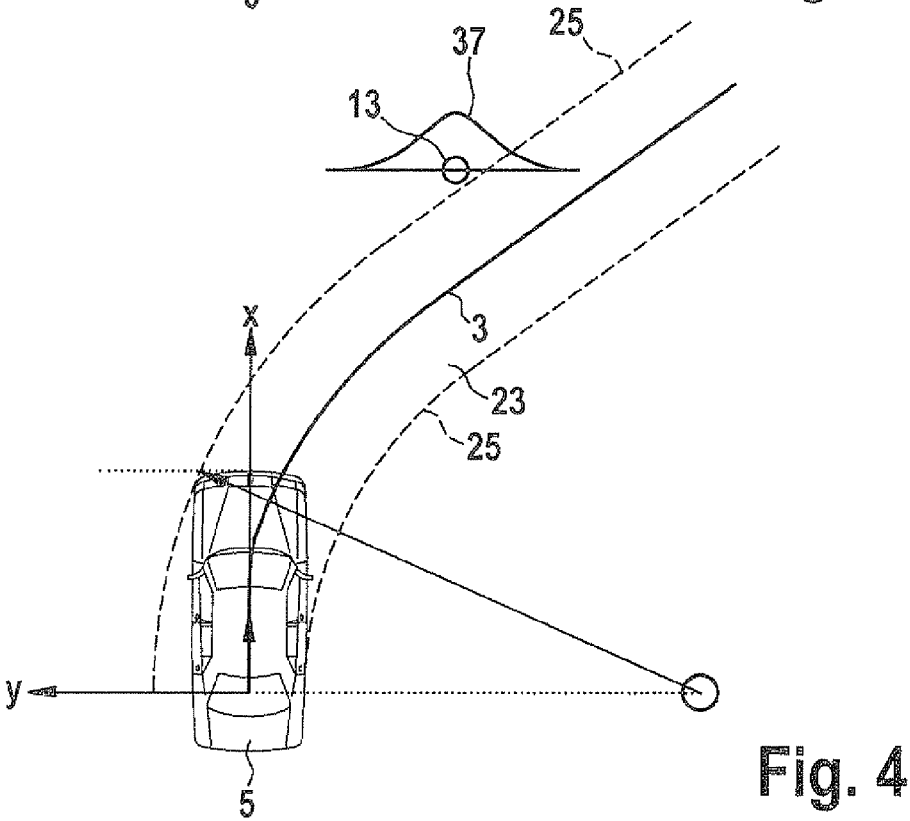
FIG. 4 shows a schematic representation of the overlap between the travel path and the position fuzziness of a coordinate point in the ordinate direction.

Since the collision probability increases as the distance of the object to travel path 23 decreases, it is sufficient to base the determination of the collision probability on only coordinate point 13, which has the shorter distance to travel path 23 or to course trajectory 3. FIG. 4 shows a schematic representation of the overlap between travel path 23 and the position fuzziness of one coordinate point in the ordinate direction. The coordinate point illustrated in FIG. 4 corresponds to second coordinate point 13 in FIG. 2, which marks the coordinate point located closer to course trajectory 3. Side delimitations 25 of travel path 23 are also illustrated by dashed lines in FIG. 4.

Further simplification is possible if only the degree of overlap in the ordinate direction is determined for determining the collision probability. In this case, the overlapping area is not determined, but the portion of the position fuzziness overlapping side delimitation 25 of travel path 23 in the ordinate direction is determined, which is represented by line segment 35. The position fuzziness may be assumed in the form of a Gaussian distribution 37. The maximum of Gaussian distribution 37 is located on a level with coordinate point 13. The value of Gaussian distribution 37 decreases as the distance from coordinate point 13 increases. In the calculation of the collision probability, this means that the collision probability also decreases as the distance of travel path 23 from coordinate point 13 increases.

A collision probability of less than 50% is obtained if coordinate point 13 is located outside travel path 23 and more than 50% of coordinate point 13 is positioned within the travel path, taking the position fuzziness into account in the form of the Gaussian distribution.

Figure 5:
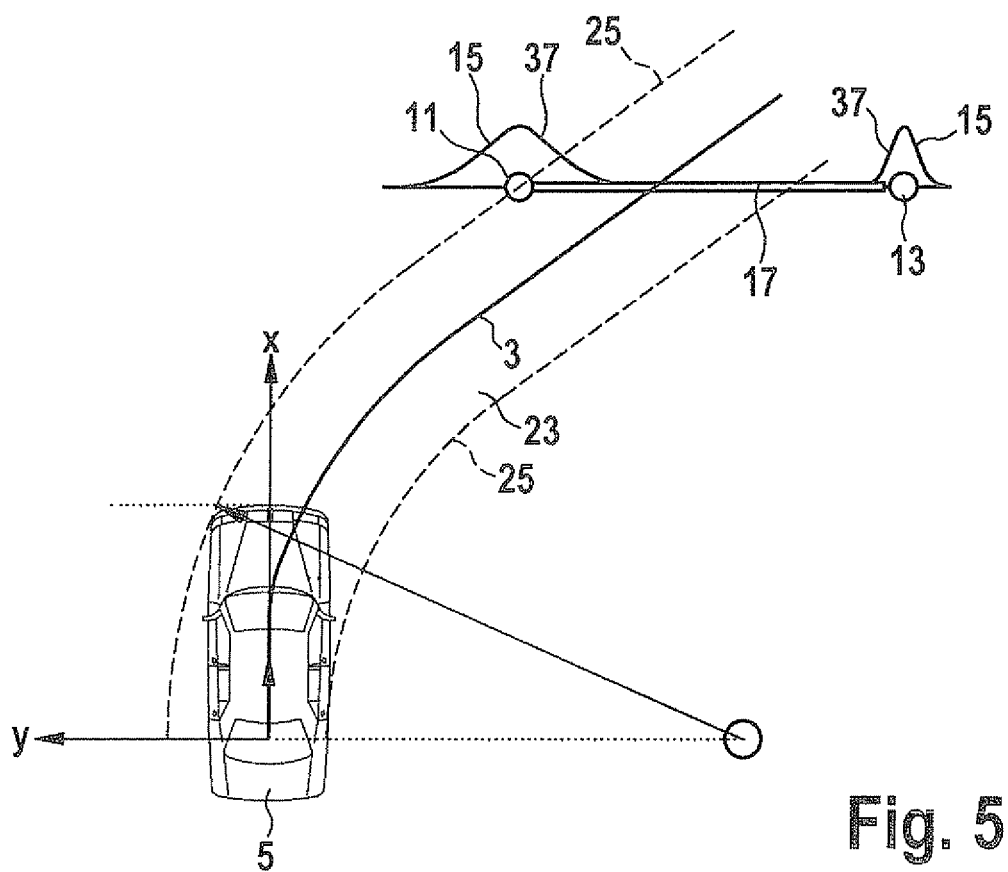
FIG. 5 shows a travel path having an object located across the travel path.

A special situation is illustrated in FIG. 5. In this case, an object is located across the travel path, the coordinate points each being located on different sides of the travel path.

In this case, it is possible, on the one hand, to evaluate the position fuzziness values of both coordinate points 11, 13 to determine the collision probability. In this case, position fuzziness 15 is again assumed as Gaussian distribution 37. The probability of second coordinate point 13 being located outside the half of the travel path opposite first coordinate point 11 has to be determined as a relevant measure.

Since it must be generally assumed that the object characterized by coordinate points 11, 13 is located across travel path 23 in the event that first coordinate point 11 and second coordinate point 13 are located on opposite sides of the travel path, the fact that the collision probability is 100% may be assumed.

What is claimed is:

1. A method for mapping surroundings of a vehicle, the method comprising:
    detecting objects in the surroundings of the vehicle with the aid of sensors, wherein a detected object of the detected objects is described by two coordinate points and two position fuzziness values, wherein the two coordinate points represent opposite boundaries of the detected object, wherein each of the two position fuzziness values is determined separately, and wherein each coordinate point of the two coordinate points is associated with one distinct position fuzziness value of the two position fuzziness values determined separately; and
    storing the two coordinate points and the two position fuzziness values in an interface in the form of data which may be accessed by a driver assistance system of the vehicle; and
    creating a mapping of the surroundings of the vehicle based, at least in part, on the two coordinate points and the two position fuzziness values, wherein the created mapping is used to determine a collision probability of the vehicle.

2. The method of claim 1, wherein an indication of whether each of the two coordinate points describes an actual end of a line segment is additionally defined when the line segment is marked by the two coordinate points.

3. The method of claim 1, wherein a Cartesian coordinate system having a central point of a rear axle as the origin is used as a reference coordinate system.

4. The method of claim 3, wherein an abscissa of the Cartesian coordinate system is oriented in a direction of travel and an ordinate of the Cartesian coordinate system is oriented perpendicularly thereto along the rear axle.

5. The method of claim 1, wherein the two coordinate points that represent opposite boundaries of the detected object are connected by a line segment that represents a delimiting line of the detected object.

6. A method for ascertaining a collision probability of a vehicle with an object, the method comprising:
    (a) mapping surroundings of the vehicle by performing the following:
    detecting objects in the surroundings of the vehicle with the aid of sensors, wherein a detected object of the detected objects is described by two coordinate points and two position fuzziness values, wherein the two coordinate points represent opposite boundaries of the detected object, and wherein each coordinate point of the two coordinate points is associated with one position fuzziness value of the two position fuzziness values; and
    storing the two coordinate points and the two position fuzziness values in an interface in the form of data which may be accessed by a driver assistance system of the vehicle;
    (b) ascertaining a travel path to be traveled by the vehicle; and
    (c) determining a degree of overlap between the object and the travel path and a collision probability, taking the position fuzziness values into account, wherein only an ordinate coordinate of the coordinate point of the object is taken into account to determine the degree of overlap.

7. The method of claim 6, wherein each position fuzziness value of the two position fuzziness values is described by a Gaussian distribution.

8. The method of claim 6, wherein only the coordinate point of the object, which is located closest to the travel path, is used to determine the degree of overlap if both coordinate points which describe the object are located on the same side of the travel path.

9. The method of claim 6, wherein a collision probability of 100% is assumed if the two coordinate points of the object are located on different sides of the travel path or if one coordinate point of the two coordinate points is located in the travel path.

10. The method of claim 6, wherein the vehicle is brought to a stop before it reaches the position of the object in the event of a collision probability of at least 30%.

11. The method of claim 6, wherein the two coordinate points that represent opposite boundaries of the detected object are connected by a line segment that represents a delimiting line of the detected object.

12. A method for ascertaining a collision probability of a vehicle with an object, the method comprising:
    (a) mapping surroundings of the vehicle by performing the following:
    detecting objects in the surroundings of the vehicle with the aid of sensors, wherein a detected object of the detected objects is described by two coordinate points and two position fuzziness values, and wherein each coordinate point of the two coordinate points is associated with one position fuzziness value of the two position fuzziness values; and
    storing the two coordinate points and the two position fuzziness values in an interface in the form of data which may be accessed by a driver assistance system of the vehicle;
    (b) ascertaining a travel path to be traveled by the vehicle; and
    (c) determining a degree of overlap between the object and the travel path and a collision probability, taking the position fuzziness values into account,
    wherein side delimitations of the travel path are determined by a trajectory of a front vehicle corner and a trajectory of a side point of the vehicle that is on an opposite side of the front vehicle corner and that is located on a point of the side of the vehicle where the side of the vehicle intersects a straight line extending from a rear axle of the vehicle in a direction of the rear axle.

* * * * *